United States Patent
Han et al.

(10) Patent No.: US 10,627,248 B2
(45) Date of Patent: Apr. 21, 2020

(54) COGNITIVE LOAD ROUTING METRIC FOR VEHICLE GUIDANCE

(71) Applicant: Apple Inc., Cupertino, CA (US)

(72) Inventors: Byron B. Han, San Jose, CA (US); Jamie P. Carlson, San Jose, CA (US); Robert J. Gough, Sudbury, MA (US)

(73) Assignee: APPLE INC., Cupertino, CA (US)

( * ) Notice: Subject to any disclaimer, the term of this patent is extended or adjusted under 35 U.S.C. 154(b) by 271 days.

(21) Appl. No.: 15/711,691

(22) Filed: Sep. 21, 2017

(65) Prior Publication Data

US 2018/0080785 A1 Mar. 22, 2018

Related U.S. Application Data

(60) Provisional application No. 62/397,552, filed on Sep. 21, 2016.

(51) Int. Cl.
| | |
|---|---|
| *G01C 21/34* | (2006.01) |
| *G01C 21/36* | (2006.01) |
| *B60W 50/00* | (2006.01) |
| *G05D 1/00* | (2006.01) |
| *G05D 1/02* | (2020.01) |

(Continued)

(52) U.S. Cl.
CPC ..... *G01C 21/3484* (2013.01); *B60W 50/0098* (2013.01); *G01C 21/3453* (2013.01); *G01C 21/3461* (2013.01); *G01C 21/3492* (2013.01); *G01C 21/3676* (2013.01); *G08G 1/0112* (2013.01); *G08G 1/096827* (2013.01); *G08G 1/096833* (2013.01); *B60W 2540/22* (2013.01); *G05D 1/0088* (2013.01);

(Continued)

(58) Field of Classification Search
CPC .......... B60W 50/0098; B60W 2540/22; G01C 21/3483; G01C 21/3461; G01C 21/3453; G01C 21/3492; G01C 21/3676; G05D 1/0088; G05D 2201/0213; G06F 3/00; G06F 3/048; G06F 2203/011; G08G 1/096833; G08G 1/96827; G08G 1/0112; G08G 1/096816; G08G 1/096877; G08G 1/096838; G08G 1/096844
USPC ......................................................... 701/25
See application file for complete search history.

(56) References Cited

U.S. PATENT DOCUMENTS

| | | |
|---|---|---|
| 6,269,304 B1 | 7/2001 | Kaji et al. |
| 6,599,243 B2 | 7/2003 | Woltermann et al. |

(Continued)

FOREIGN PATENT DOCUMENTS

JP 2008151752 A 7/2008

*Primary Examiner* — Behrang Badii
*Assistant Examiner* — Hossam M Abd El Latif
(74) *Attorney, Agent, or Firm* — Young Basile Hanlon & MacFarlane, P.C.

(57) ABSTRACT

A method for routing a vehicle includes receiving a current location for the vehicle and a destination location for the vehicle and identifying candidate navigation routes extending between the current location and the destination location. The method also includes determining a cognitive load parameter for each candidate navigation route and determining a cost value for a cost function for each candidate navigation route. Each cost value is based on the cognitive load parameter for the respective candidate navigation route. The method also includes selecting the navigation route from the candidate navigation routes based on the cost values for the candidate navigation routes.

20 Claims, 5 Drawing Sheets

(51) Int. Cl.
 *G08G 1/01* (2006.01)
 *G08G 1/0968* (2006.01)
(52) U.S. Cl.
 CPC ... *G05D 1/0276* (2013.01); *G05D 2201/0213* (2013.01); *G08G 1/096855* (2013.01)

(56) References Cited

U.S. PATENT DOCUMENTS

| | | | |
|---|---|---|---|
| 7,587,260 | B2 | 9/2009 | Bruemmer et al. |
| 7,711,478 | B2 | 5/2010 | Gluck |
| 9,384,661 | B1* | 7/2016 | DeLuca ............ G08G 1/096838 |
| 10,260,898 | B2* | 4/2019 | McNew ............. G01C 21/3453 |
| 2005/0131628 | A1 | 6/2005 | Peeters |
| 2005/0256635 | A1* | 11/2005 | Gardner ................ G01C 21/26 |
| | | | 701/431 |
| 2007/0192038 | A1 | 8/2007 | Kameyama |
| 2009/0125174 | A1* | 5/2009 | Delean ................... G08G 1/202 |
| | | | 701/24 |
| 2010/0036599 | A1 | 2/2010 | Froeberg et al. |
| 2010/0318291 | A1 | 12/2010 | Gluck |
| 2013/0006521 | A1 | 1/2013 | Needham et al. |
| 2014/0136107 | A1* | 5/2014 | Pfeifle ................... G01C 21/32 |
| | | | 701/533 |
| 2015/0345971 | A1 | 12/2015 | Meuleau et al. |
| 2015/0345984 | A1* | 12/2015 | Graham ............. G01C 21/3697 |
| | | | 701/400 |
| 2016/0231129 | A1* | 8/2016 | Erez ................... G01C 21/3676 |
| 2018/0024553 | A1* | 1/2018 | Kong ................. G01C 21/3407 |
| | | | 701/26 |
| 2018/0093673 | A1* | 4/2018 | Yuhara ............. B60W 50/0098 |

* cited by examiner

COGNITIVE LOAD ROUTING METRIC FOR VEHICLE GUIDANCE

CROSS-REFERENCE TO RELATED APPLICATIONS

This application claims the benefit of U.S. Provisional Application No. 62/397,552, filed on Sep. 21, 2016, entitled "Cognitive Load Routing Metric for Vehicle Guidance," the content of which is incorporated by reference in its entirety for all purposes.

TECHNICAL FIELD

This disclosure relates generally to vehicle guidance and, more specifically, to selection of a navigation route for a vehicle based on a routing metric with cognitive load included in a cost function.

BACKGROUND

Vehicle routing systems can offer a driver of the vehicle routing options that vary a navigation route for the vehicle. The routing system can receive an input from the driver as to preferences for traveling a fastest route, a shortest route, a toll-free route, a highway-based route, a highway-free route, etc. Selection of the navigation route by the routing system can be based both on the input from the driver and a routing metric that gives weight to calculated and/or determined routing factors such as estimated time to traverse a route, total distance to a destination, types of roadways on a route (e.g., numbers of lanes, frequency of traffic signals, etc.), and presence of toll stations on a respective route.

SUMMARY

An aspect of the disclosed embodiments is a method for selecting a navigation route for a vehicle. The method includes receiving, by a processor, a current location for the vehicle and a destination location for the vehicle; identifying, by the processor, candidate navigation routes extending between the current location and the destination location; determining, by the processer, a cognitive load parameter for each candidate navigation route; and selecting, by the processor, the navigation route from the candidate navigation routes based on the cognitive load parameters for the candidate navigation routes.

Another aspect of the disclosed embodiments is a system for selecting a navigation route. The system includes a controller apparatus configured to perform operations comprising receiving a current location for a vehicle and a destination location for the vehicle; identifying candidate navigation routes extending between the current location and the destination location; determining a cognitive load parameter for each candidate navigation route; and selecting the navigation route from the candidate navigation routes based on the cognitive load parameters for the candidate navigation routes.

Another aspect of the disclosed embodiments is a non-transitory computer-readable storage medium including program instructions executable by one or more processors that, when executed, cause the one or more processors to perform operations, the operations comprising: receiving a current location for a vehicle and a destination location for the vehicle; identifying candidate navigation routes extending between the current location and the destination location; determining a cognitive load parameter for each candidate navigation route; and selecting the navigation route from the candidate navigation routes based on the cognitive load parameters for the candidate navigation routes.

BRIEF DESCRIPTION OF THE DRAWINGS

The disclosure is best understood from the following detailed description when read in conjunction with the accompanying drawings.

DETAILED DESCRIPTION

For a human driver, various routing factors such as roadway infrastructure, traffic levels or patterns, presence of toll stations or border crossings, and construction can impact a level of mental effort required by the driver to successfully and safely navigate the roadway. Environmental factors such as weather conditions, olfactory conditions (e.g., baking bread, smoke, chemical presence, skunk spray), noise conditions, landscapes, and presence of pedestrians can also impact a level of mental effort required by a driver to navigate the roadway.

Cognitive load is an amount of mental activity or mental effort being imposed on a working memory of a driver at a given time and can directly impact performance in navigating the roadway. Higher cognitive loads can lower the driver's sensitivity to external stimuli, lower the driver's confidence in decision making, and negatively impact a driver's overall performance. Lower cognitive loads can improve the driver's mood and performance in operating a vehicle on the roadway. In autonomous applications, cognitive load can be described as a level of computational complexity being imposed, for example, on a processor in a controller at a given time and can also directly impact performance in navigating the roadway. Higher cognitive loads can also lower the controller's confidence in decision making. The below-described routing systems include a routing metric that incorporates a cognitive load parameter into a weighted function in selecting a navigation route for the vehicle.

Figure 1:
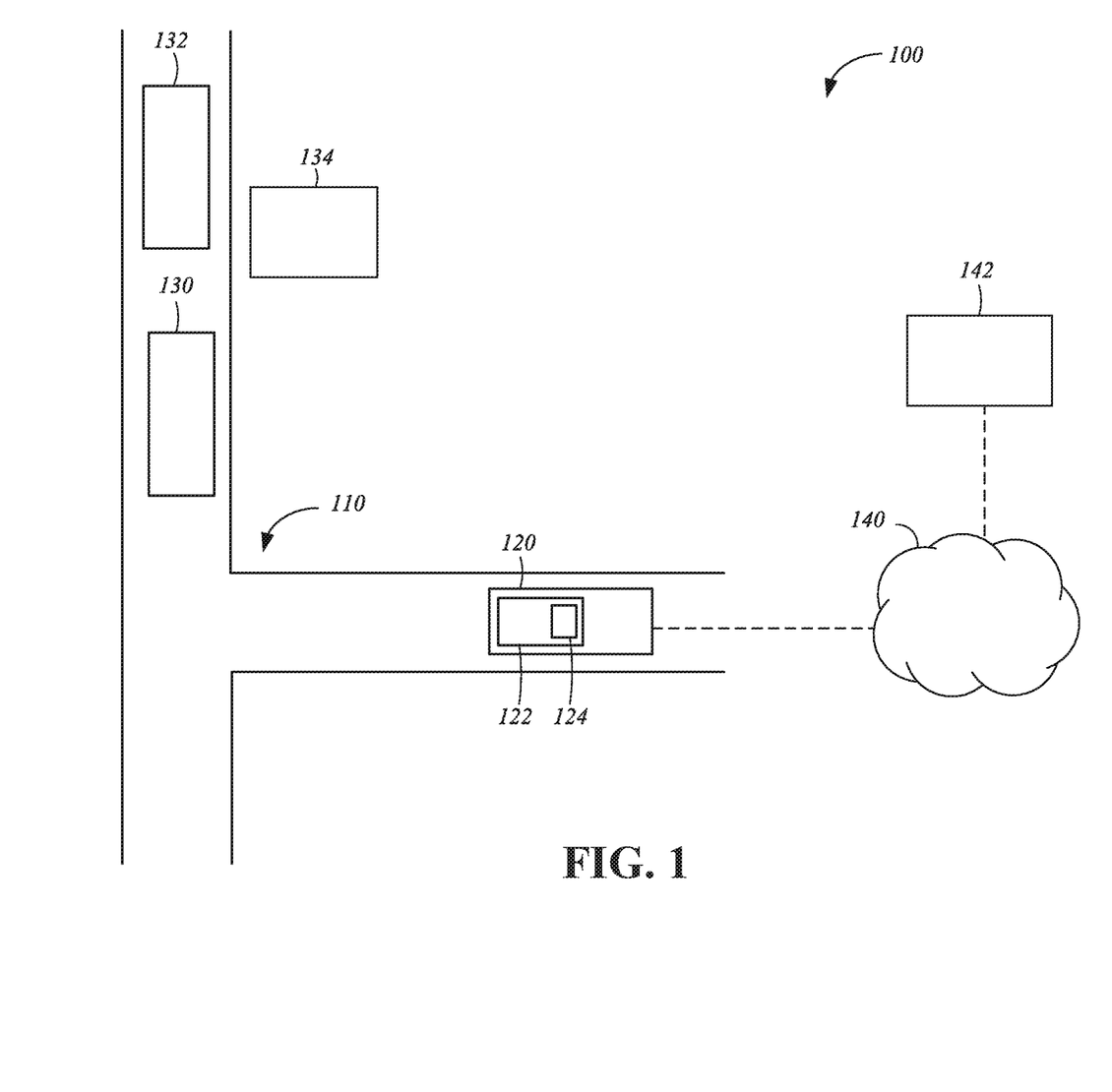
FIG. 1 is a diagram showing vehicles in a transportation system.

FIG. 1 illustrates a transportation system 100 that includes a vehicle transportation network 110 and a vehicle 120. The vehicle transportation network 110 can include paths, routes, roads, streets, highways, thoroughfares, railways, bridges, overpasses, or any surface that can be traversed by the vehicle 120. In some embodiments, the vehicle 120 can include a controller apparatus 122 that can incorporate or be associated with one or more sensors 124 and can communicate with various vehicle systems (not shown). In some embodiments, the vehicle 120 can be an autonomous vehicle.

The sensors 124 can generate sensor data by detecting the state or condition of a portion of the transportation system 100 including the vehicle transportation network 110, the vehicle 120, or extra-vehicular objects such as a vehicle 130, a vehicle 132, or a building 134. As an example, the sensor 124 can include sensors such as an accelerometer, a gyroscope, a still image camera, a video camera, an infrared sensor, a light detection and ranging (LIDAR) system, a radar system, a sonar system, a thermometer, a barometer, a moisture sensor, a vibration sensor, a capacitive input sensor, or a resistive input sensor.

The transportation system 100 can include one or more electronic communication networks 140 used for communicating data or any type of electronic signals communicated between one or more computing devices. As an example, the communication network 140 can include a local area network (LAN), a wide area network (WAN), a storage area networks (SAN), a virtual private network (VPN), a cellular telephone network, or the Internet. The communication network 140 can transmit or receive data using a communication protocol such as transmission control protocol (TCP), user Datagram protocol (UDP), Internet protocol (IP), real-time transport protocol (RTP), or hypertext transport protocol (HTTP).

The controller apparatus 122 can exchange data with a remote computing system 142 via the communication network 140. The remote computing system 142 can include computing devices such as server computing devices and client computing devices, and each of the computing devices can include a processor, a memory, and a communication interface that can be used to exchange data through the communication network 140. As an example, the remote computing system 142 can operate via wire or wirelessly, be terrestrially based (e.g. in a cellular tower) or non-terrestrially based (e.g. in an orbiting satellite), and can include one or more network access devices such as a router, a hub, a relay, or a switch. In an implementation, the remote computing system 142 can store data, such as geolocation data, which can be exchanged with the controller apparatus 122 of the vehicle 120.

Figure 2:
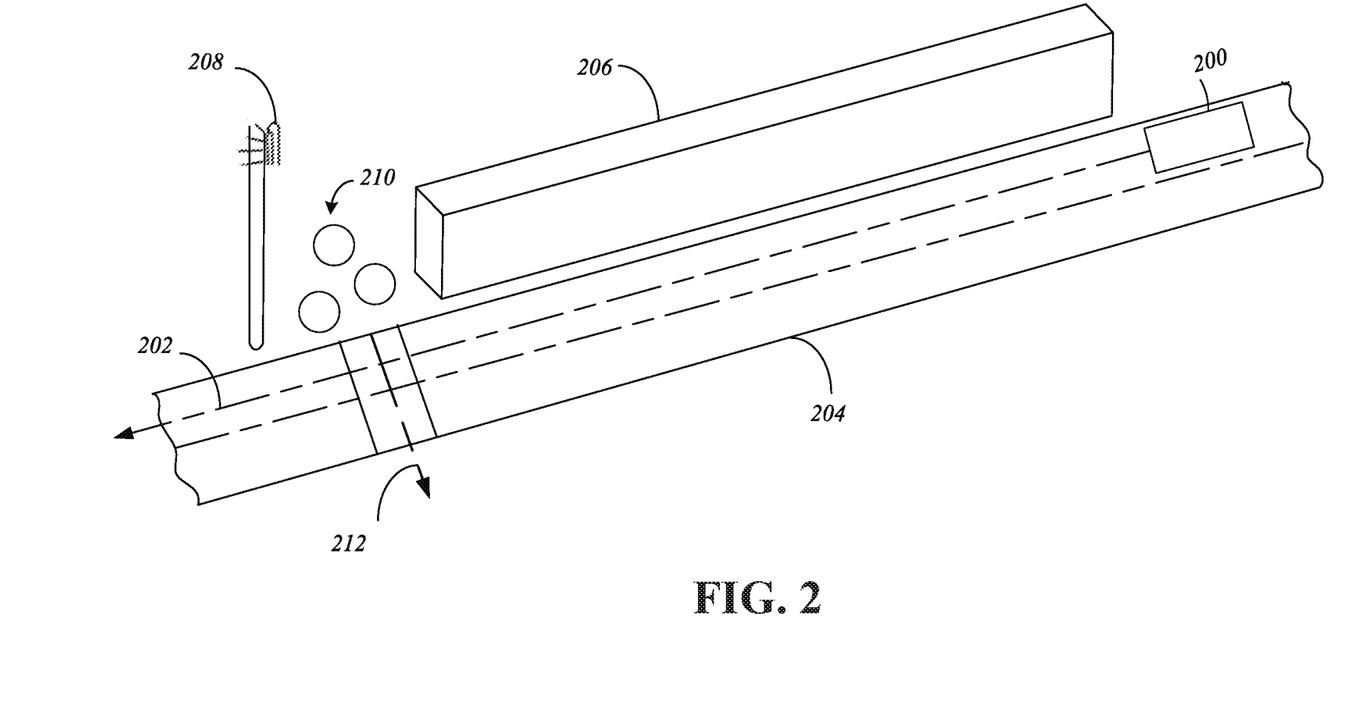
FIG. 2 is a diagram showing a vehicle traversing a navigation route.

FIG. 2 is a diagram showing a vehicle 200 traversing a navigation route 202 along a roadway 204. The navigation route 202 can extend along the roadway 204 between a current location of the vehicle 200 (shown) and a destination location (not shown). A cognitive load parameter can be associated with the navigation route 202. The cognitive load parameter, representative of the cognitive load or mental effort associated with traversing the navigation route 202 for the driver of the vehicle 200 or the complexity of processing commands associated with traversing the navigation route 202 for the controller apparatus 122 in an autonomous application, can be based on a variety of types of information associated with the navigation route 202.

For example, the cognitive load parameter can be based on a plurality of cognitive load component factors. Each of the cognitive load component factors can be based on sensed or accessed information available to the vehicle 200. Each type of sensed or accessed information can be related to a score, for example, between zero and one, available in a lookup table or per a calculated function. The various scores for the various cognitive load component factors can be combined in some way, for example, using a weighted average, to determine an overall cognitive load parameter for use in a cost function evaluating the navigation route 202.

One type of information that impacts the cognitive load parameter associated with the navigation route 202 is infrastructure information. Infrastructure information includes construction information related to features of the roadway 204 such as a number of lanes in the roadway 204 and a width of the lanes and shoulders on the roadway 204. For example, narrow lane widths or the absence of a shoulder on the roadway 204 can impose a higher cognitive load. In another example, and as shown, the presence of a barrier 206 near an edge of one of the lanes of travel on the roadway 204 can also impose a higher cognitive load. Infrastructure information also includes construction information related to features such as types of materials from which the roadway 204 is constructed and a layout of intersections along the roadway 204. Intersections of higher complexity can impose a higher cognitive load.

Infrastructure information can also include construction information related to the presence and location of traffic signals and street lights such as lamp 208. In this example, the lamp 208 can decrease the cognitive load of the driver of the vehicle 200 since the lamp 208 illuminates an area beyond the barrier 206 that would be hidden from the vehicle 200 at its current location along the navigation route 202. Infrastructure information can also include, for example, resource information related to the presence and location of resources such as charging stations, fuel sources, public rest-stops, etc. that have a physical presence at a specific location on the roadway 204. Infrastructure information can also include resource information related to schedules for parking availability, street sweeping, snow removal, or salt or sand application for the roadway 204. For example, the recent presence of a salt truck or a plow on the roadway 204 can reduce a cognitive load since the salt truck or plow would improve conditions on the roadway 204.

Another type of information that impacts the cognitive load parameter associated with the navigation route 202 is traffic information. Traffic information includes pedestrian information, that is, information related the presence and density of pedestrian traffic. As shown in FIG. 2, a pedestrian group 210 is positioned to follow a pedestrian path 212 across the roadway 204. The presence of the barrier 206 can make it difficult to discern the pedestrian group 210 from the current location of the vehicle 200 despite the presence of the lamp 208. In this example, the cognitive load would be increased based both on the presence of the pedestrian group 210 (traffic information) and the barrier 206 (construction information) while being slightly decreased based on the presence of the lamp 208 (construction information).

Traffic information can also include density information related to traffic density (e.g., number of vehicles on the roadway 204), incident information related to traffic incidents (e.g. collisions, breakdowns, etc.), and speed information related to traffic speed. Traffic speed can include both the average speed of vehicles on the roadway 204 and a magnitude of deviation to posted speed limits for vehicles on the roadway 204. For example, vehicles can be traveling 50 mph in a zone having a speed limit of 70 mph with very little deviation from the 50 mph speed. This speed profile, where vehicles are traveling below a speed limit but at a steady pace, can have a lighter cognitive load than, for example, a speed profile where vehicles deviate between a speed of 65 mph and 15 mph, representative of stop-and-go traffic, within the same zone having the speed limit of 70 mph.

Figure 3:
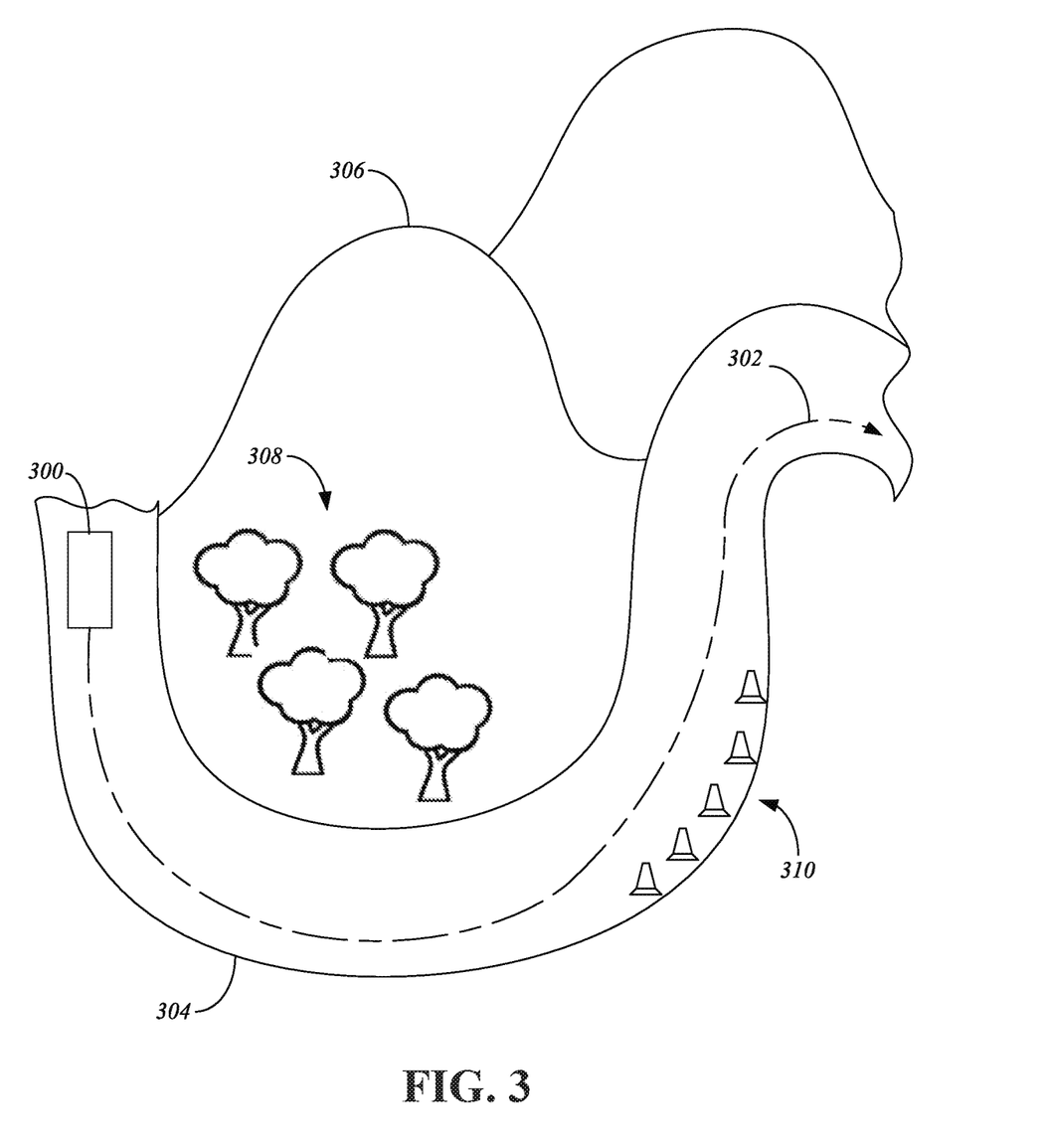
FIG. 3 is a diagram showing another vehicle traversing another navigation route.

FIG. 3 is a diagram showing a vehicle 300 traversing another navigation route 302 along a roadway 304. The navigation route 302 can extend along the roadway 304 between a current location of the vehicle 300 (shown) and a destination location (not shown). A cognitive load parameter can be associated with the navigation route 302. The cognitive load parameter can be based on a variety of types of information associated with the navigation route 302.

One type of information that impacts the cognitive load parameter associated with the navigation route 302 is environment information. Environment information can include scenic information related to the presence of scenic surroundings. For example, the roadway 304 can curve around a mountain 306 and include a tree group 308 that provides a pleasant view to the driver of the vehicle 300. Scenic information can also include information related to changes in elevation of the roadway 304 or the presence of twists and turns in the roadway 304 which impact visibility of the navigation route 302. Some types of scenic information can indicate a decrease in cognitive load, for example, when the driver of the vehicle 300 indicates enjoyment in the presence of pleasant surroundings. Other types of scenic information can indicate an increase in cognitive load, for example, when the driver of the vehicle 300 suffers from motion sickness.

Environment information can also include weather information related to a presence of conditions such as rain, snow, sleet, ice, fog, glare from the sun, sulfurous odors, etc. The presence of some weather conditions can increase cognitive load. For example, the presence of rain, snow, sleet, or fog will decrease visibility on the roadway 304. In another example, the presence of ice will increase the difficulty of safely operating the vehicle 300 on the roadway 304. Environment information can also include security information related to the security level of the area where the roadway 304 is located. For example, security information can include information related to a presence of civil unrest and a number of security incidents reported by law enforcement in a certain area. Security information of this nature can lead to an increase in the cognitive load for the driver when traversing the navigation route 302.

FIG. 3 also shows a construction-cone group 310 present in one of the lanes of the roadway 304. The presence of the construction-cone group 310, available as a form of construction information, can increase cognitive load since the driver can need to exert additional mental effort to navigate around the construction-cone group 310. Other types of construction information include a presence of construction zones, an absence of lane markings based on construction on the roadway 304, and a presence of temporary lanes shifts during construction, each of which can increase cognitive load for a given portion of the navigation route 302.

Each of the various types of information described in FIG. 2 and FIG. 3, that is, infrastructure information, traffic information, and environment information, can impact a cognitive load parameter associated with the navigation routes 202, 302 described. Further, various types of information be available at the same location at a common time can have a larger impact on the cognitive load parameter. In FIG. 3, for example, the roadway 304 curves around the tree group 308, blocking visibility of the construction-cone group 310 from the vehicle 300. In other words, the combination of scenic information and construction information available for this portion of the roadway 304 indicates a potentially greater increase in cognitive load than if each piece of information were considered individually.

Much of the above-described information used to determine the cognitive load parameter can be crowd-sourced. For example, remote databases can collect and provide an average number of lane changes, a location of barriers, the acceleration and deceleration profiles for various vehicles, and reports of unmarked roads or construction zones. The information can also be collected from other sources such as navigation maps, connected vehicles having lane keeping systems to identify lane markings, plow service agencies that follow salting schedules, departments of transportation that post construction information, and park systems that identify scenic routes.

Figure 4:
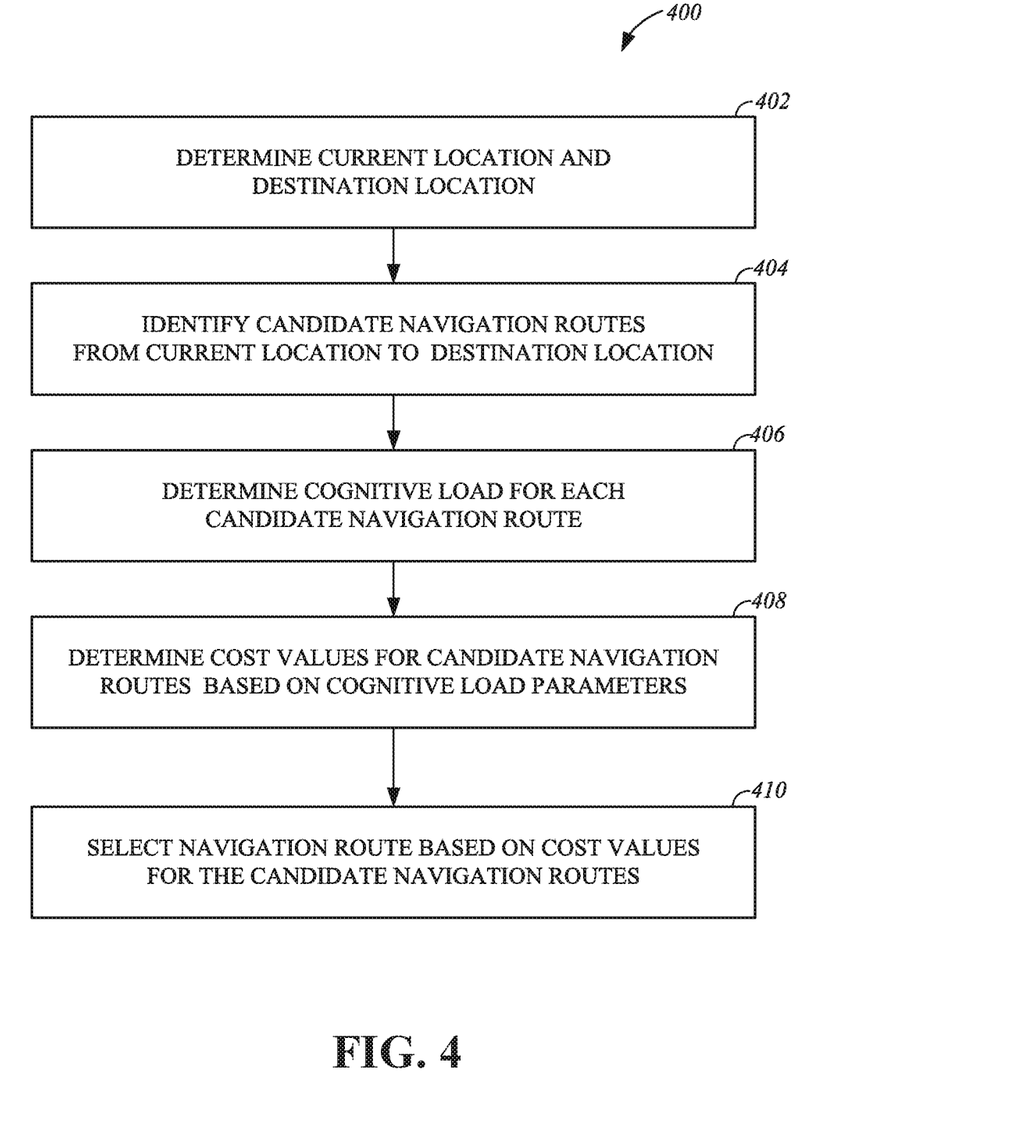
FIG. 4 is a flow chart of a method of selecting a navigation route for a vehicle.

FIG. 4 is a flow chart of a method 400 of selecting a navigation route for a vehicle. In operation 402, a current location and a destination location can be determined. For example, a the controller apparatus 122 of the vehicle 120 of FIG. 1 can determine a current location for the vehicle 120. In an implementation, the controller apparatus 122 determines a current location of the vehicle 120 based on a correspondence between a position of the vehicle 120 and geographic location data associated with the position. The geographic location data can include the position in geographic coordinates and additional data corresponding to the location such as: whether the location is urban, suburban, or rural; noise regulations associated with the geographic location; and/or traffic data or construction data associated with the geographic location. In another implementation, the controller apparatus 122 determines a current location of the vehicle 120 based on geographic location data associated with a mobile device in the possession of the driver of the vehicle 120.

The destination location for the vehicle 120 can be determined, for example, based on an input received into a routing or navigation application associated with vehicle 120 or the mobile device in the possession of the driver of the vehicle 120. The destination location can also be based, for example, on passenger information. Passenger information can include calendar information associated with the driver of the vehicle 120. For example, a calendar application associated with the driver can include information related to a meeting or social event occurring in the near future. The calendar entry for the meeting or social event can include geographic location data that can be used to identify the destination location.

In operation 404, candidate navigation routes extending between the current location and the destination location can be identified. The candidate navigation routes can include potentials paths of travel between the current location and the destination location. In known routing systems, candidate navigation routes can include a variety of different types of navigation routes between the current location and the destination location such as a shortest route, a fastest route, a toll-free route, a highway-based route, etc.

In operation 406, a cognitive load parameter is determined for each of the candidate navigation routes. As described above, the cognitive load parameter can be based on infrastructure information, traffic information, and environment information. Additionally, the cognitive load parameter can be based on passenger information. Passenger information can include calendar information for the driver as previously described. Passenger information can also include biometric information for the driver of the vehicle 120, for example, an elevated stress level associated that can be attributed to traversing some navigation routes.

Different types of passenger information can be used together with infrastructure information, construction information, and/or environment information as cognitive load component factors to determine the cognitive load parameter. For example, calendar information associated with the driver of the vehicle 120 can indicate that the driver has a meeting in twenty minutes, construction information can indicate that the fastest route is currently blocked, and biometric information associated with the driver of the vehicle 120 can indicate that the driver has increased stress levels whenever she is late for a meeting. Thus, the cognitive load parameter can be a low value for a next-fastest route between the current location and the destination location for the driver in this example. The sensors 124 associated with the vehicle 120 can be used to collect biometric information based on situations where relaxation, happiness, irritation, or aggravation is present, and the controller apparatus 122 can learn which situations most highly impact cognitive load for the driver in order to adjust the routing metric.

In operation 408, a cost value for a cost function for each candidate navigation route is determined. Each cost value is based on the cognitive load parameter for the respective candidate navigation route. The cognitive load parameter can be based on at least one of passenger information, infrastructure information, traffic information, or environment information as previously described. Each cost value can also be based on other parameters associated with traditional routing metrics, such as distance parameters related to the total distance of a candidate navigation route and toll parameters related to the presence of toll roads on a candidate navigation route.

One type of cost function that can be used to determine cost values for each of the candidate navigation routes is a weighted-method cost function. Using the weighted-method cost function, multiple objectives can be combined into a single-objective scalar function. This type of cost function is also known as a weighted-sum or scalarization-based cost function. One example weighted-method cost function is $f_k = w_j C_{Dk} + w_j C_{Sk} + w_j C_{CLk}$.

Here, k=1, . . . , n with n being the number of candidate navigation routes, and w={$w_j$|j=1, . . . , n} represents the set of weights applied to specific parameters in the cost function. $C_D$ is a distance parameter representing a distance travelled for a candidate navigation route, $C_S$ is a speed parameter representing an average speed for vehicles during a certain time period along a candidate navigation route, and $C_{CL}$ is a cognitive load parameter representing a cognitive load measure for a candidate navigation route. Using the above cost function, various weights can be applied to the various parameters depending on the preferences of the driver of the vehicle 120 or the underlying construction of the routing metric. A cost value can then be determined for each of the candidate navigation routes. Though a weighted-sum method is described here, other types of cost functions can be used to determine the cost values.

In operation 410, the method 400 includes selecting the navigation route from the candidate navigation routes based on the cost values for the candidate navigation routes. For example, the candidate navigation route having the lowest cost value for the cost function can be selected. When the candidate navigation route has the lowest cost value based on a low value or a high weight for the cognitive load parameter, it can be classified as a relaxed route. The relaxed route can be one in which the driver or the controller apparatus 122 will face a lower cognitive load level. The relaxed route can be offered as a selection when route guidance preferences are entered into a routing or navigation application. The driver can also retain the ability to override an automated selection of the relaxed route by the controller apparatus 122 given personal preference at a given time while traveling the navigation route.

Since the cognitive load level reflects both mental effort and computational complexity, the relaxed route is useful in autonomous applications. The relaxed route can provide the controller apparatus 122 with a high level of confidence in autonomous navigation, ensuring safe operation by selecting the candidate navigation route associated with a low cognitive load. For example, a low cognitive load applies to navigation routes having clear lane markings, low levels of traffic, few pedestrians, and simple intersections, all features that improve confidence levels in autonomous operation of the vehicle 120 by the controller apparatus 122. In the autonomous application, the method 400 can further include the controller apparatus 122 sending a command to one or more vehicles systems to automatically move the vehicle 120 along the selected navigation route after the navigation route is selected from the candidate navigation routes. In driver-based applications, the method 400 can further include the controller apparatus 122 sending a representation of the navigation route to support guidance along the navigation route to, for example, a display on a vehicle interface for viewing by the driver of the vehicle 120.

In other examples of selecting the navigation route from the candidate navigation routes in operation 410, the controller apparatus 122 can select a candidate navigation route having a cost value within a predetermined range of cost values more suited to a specific individual. Instead of selecting the candidate navigation route with the lowest cost value, the controller apparatus 122 can learn to select the navigation route with a mid-level cost value for the cost function based on, for example, biometric information collected related to reactions by the driver over time to various types of route selections. For example, some drivers never want to be late, some drivers (or passengers) experience motion sickness and want to avoid roadways such as roadway 304 in FIG. 3, and some drivers want to take the most scenic route regardless of lateness for a meeting or social event.

Figure 5:
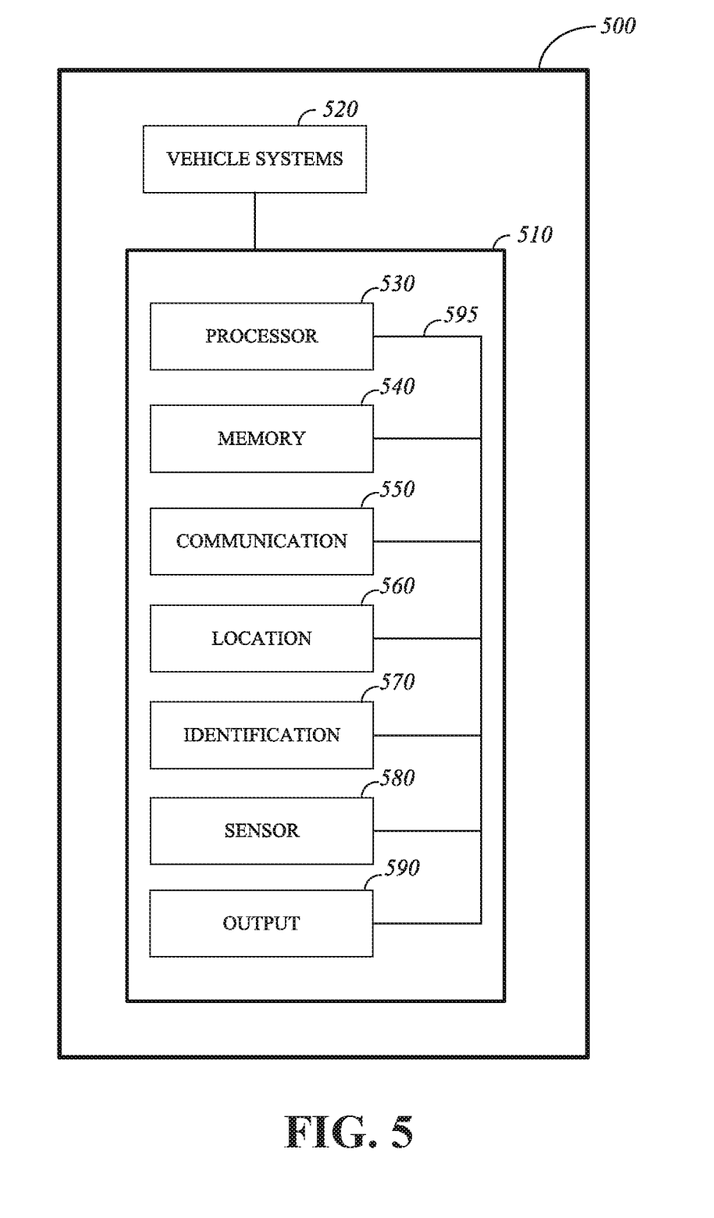
FIG. 5 is a diagram of an example of a controller apparatus for a vehicle.

FIG. 5 is a diagram of an example of a vehicle 500 in which the aspects, features, and elements disclosed here can be implemented. FIG. 5 illustrates that the vehicle 500 includes a controller apparatus 510 which can be used to control a variety of vehicle systems 520 or combinations of vehicle systems 520 of the vehicle 500. The vehicle 500 can include some or all of the features of the vehicle 120 illustrated in FIG. 1, and the controller apparatus 510 can include some or all of the features of the controller apparatus 122 illustrated in FIG. 1. The vehicle systems 520 can include battery systems, powertrain systems, transmission systems, braking systems, steering systems, suspension systems (not shown), or any other systems used to actuate and/or control movement of the vehicle 500.

The controller apparatus 510 can include any combination of a processor 530, a memory 540, a communication component 550, a location component 560, an identification component 570, a sensor component 580, an output component 590, or a communication bus 595.

In an implementation, the processor 530 can execute one or more instructions such as the program instructions stored in the memory 540. As an example, the processor 530 can include one or more: central processing units (CPUs); general purpose processors with one or more processing cores; special purpose processors with one or more cores; digital signal processors (DSPs); microprocessors; controllers; microcontrollers; integrated circuits; Application Specific Integrated Circuits (ASIC); Field Programmable Gate Arrays (FPGA); or programmable logic controllers.

The memory 540 can include a tangible non-transitory computer-readable medium that can be used to store program instructions such as computer-readable instructions, machine-readable instructions, or any type of data that can be used by the processor 530. As an example, the memory 540 can include any computer readable media that can be accessed by the processor 530, such as read only memory (ROM) or random access memory (RAM). Further, the memory 540 can include volatile memory or non-volatile memory such as: solid state drives (SSDs), hard disk drives (HDDs), dynamic random access memory (DRAM); or erasable programmable read-only memory (EPROM).

The communication component 550 can be used to transmit or receive signals, such as electronic signals, via a wired or wireless medium. As an example, the communication component 550 can transmit or receive signals such as radio frequency (RF) signals which can be used to transmit or receive data that can be used by the processor 530 or stored in the memory 540.

The location component 560 can generate navigation data or geolocation data that can be used to determine a velocity, an orientation, a latitude, a longitude, or an altitude for the vehicle 500. The location component 560 can include one or more navigation devices that are able to use navigational systems such as GPS, the long range navigation system (LORAN), the Wide Area Augmentation System (WAAS), or the global navigation satellite system (GLONASS).

The identification component 570 can include specialized instructions for: operating the vehicle 500; communicating with remote data sources; determining the state of the vehicle 500; or determining the state or identity of extra-vehicular objects. In some implementations, a portion of the memory 540 can be coupled to the identification component 570 via the communication bus 595.

The sensor component 580 can include one or more sensors that detect the state or condition of the physical environment inside the vehicle 500 and the physical environment external to the vehicle 500. In some implementations, the sensor component 580 includes one or more of: an accelerometer, a gyroscope, a still image camera, a video camera, an infrared sensor, a LIDAR system, a radar system, a sonar system, a thermometer, a barometer, a moisture sensor, a vibration sensor, a capacitive input sensor, or a resistive input sensor. As an example, the sensor component 580 can detect the state of stationary or moving objects including: physical structures such as buildings; vehicles such as automobiles and motorcycles; or non-vehicular entities such as pedestrians and vehicle drivers. Based on the sensory input detected by the sensor component 580, the sensor component 580 can generate sensor data that can be used to: operate the vehicle 500; determine the state or condition of the vehicle 500; or determine the state or condition of objects external to the vehicle 500.

The output component 590 can include one or more output devices that can be used to generate outputs including sensory outputs such as visual outputs, audible outputs, haptic outputs, or electrical outputs. In some implementations, the one or more output devices can include: visual output components to display still or video images such as a liquid crystal display (LCD), an organic light-emitting diode (OLED) display, or a cathode ray tube (CRT) display; audio output components such as loudspeakers; or haptic output components to produce vibrations or other types of tactile outputs.

The communication bus 595 can include an internal bus or an external bus and can be used to couple any combination of the processor 530, the memory 540, the communication component 550, the location component 560, the identification component 570, the sensor component 580, or the output component 590. As an example, the communication bus 595 can include one or more buses such as: a peripheral component interconnect (PCI), Serial AT attachment (SATA), a HyperTransport (HT) bus, or a universal serial bus (USB).

What is claimed is:

1. A method for selecting a navigation route for a vehicle, comprising:
   receiving, by a processor, a current location for the vehicle and a destination location for the vehicle;
   identifying, by the processor, candidate navigation routes extending between the current location and the destination location;
   determining, by the processor, a distance parameter, a speed parameter, and a cognitive load parameter for each candidate navigation route;
   determining, by the processor, a cost value for each candidate navigation route by applying weights to the distance parameter, to the speed parameter, and to the cognitive load parameter of each candidate navigation route, wherein the weights are based on biometric information related to a passenger reaction to a previously selected candidate navigation route; and
   selecting, by the processor, the navigation route from the candidate navigation routes based on the cost values for the candidate navigation routes.

2. The method of claim 1, wherein determining the cost value for each candidate navigation route includes determining a cost function for each candidate navigation route, each cost function based on summing the weighted parameters for the respective candidate navigation routes.

3. The method of claim 1, wherein selecting the navigation route includes selecting the candidate navigation route having the highest weight applied to the cognitive load parameter.

4. The method of claim 1, wherein selecting the navigation route includes selecting the candidate navigation route having the lowest cost value.

5. The method of claim 1, wherein selecting the navigation route includes selecting the candidate navigation route having a mid-level cost value within a predetermined range of cost values, wherein the predetermined range of cost values extends between the lowest cost value for the candidate navigation routes and the highest cost value for the candidate navigation routes.

6. The method of claim 1, further comprising:
   sending, by the processor, a command to one or more vehicle systems to automatically move the vehicle along the navigation route.

7. The method of claim 1, further comprising:
   sending, by the processor for display on a vehicle interface to a passenger of the vehicle, a representation of the navigation route to support guidance along the navigation route.

8. The method of claim 1, wherein the cognitive load parameter is based on at least one of passenger information, infrastructure information, traffic information, or environment information.

9. The method of claim 1, wherein the passenger reaction includes at least one of stress, relaxation, happiness, irritation, or aggravation as indicated by the biometric information.

10. The method of claim 8, wherein the cognitive load parameter is based on infrastructure information including at least one of construction information or resource information.

11. The method of claim 8, wherein the cognitive load parameter is based on traffic information including at least one of pedestrian information, density information, speed information, or incident information.

12. The method of claim 8, wherein the cognitive load parameter is based on environment information including at least one of weather information, scenic information, or security information.

13. A system for selecting a navigation route, comprising:
   a controller apparatus configured to perform operations comprising:

receiving a current location for a vehicle and a destination location for the vehicle;

identifying candidate navigation routes extending between the current location and the destination location;

determining a distance parameter and a cognitive load parameter for each candidate navigation route;

determining a cost value for each candidate navigation route by applying weights to the distance parameter and the cognitive load parameter of each candidate navigation route, wherein the weights are based on biometric information related to a passenger reaction to a previously selected candidate navigation route; and selecting the navigation route from the candidate navigation routes based on the cost values for the candidate navigation routes.

14. The system of claim 13, comprising vehicle systems configured to actuate movement of the vehicle, and wherein the operations further comprise:

sending a command to one or more of the vehicle systems to automatically move the vehicle along the navigation route.

15. The system of claim 13, wherein the cognitive load parameter is based on at least one of passenger information, infrastructure information, traffic information, or environment information.

16. The system of claim 13, wherein the passenger reaction includes at least one of stress, relaxation, happiness, irritation, or aggravation as indicated by the biometric information.

17. The system of claim 15, wherein the cognitive load parameter is based on infrastructure information including at least one of construction information or resource information.

18. The system of claim 15, wherein the cognitive load parameter is based on traffic information including at least one of pedestrian information, density information, speed information, or incident information.

19. The system of claim 15, wherein the cognitive load parameter is based on environment information including at least one of weather information, scenic information, or security information.

20. A non-transitory computer-readable storage medium including program instructions executable by one or more processors that, when executed, cause the one or more processors to perform operations, the operations comprising:

receiving a current location for a vehicle and a destination location for the vehicle;

identifying candidate navigation routes extending between the current location and the destination location;

determining a speed parameter and a cognitive load parameter for each candidate navigation route;

determining a cost value for each candidate navigation route by applying weights to the speed parameter and the cognitive load parameter of each candidate navigation route, wherein the weights are based on biometric information related to a passenger reaction to a previously selected candidate navigation route; and selecting the navigation route from the candidate navigation routes based on the cost values for the candidate navigation routes.

* * * * *